Nov. 10, 1925.                                                                1,561,192
C. W. SPICER ET AL
FLEXIBLE COUPLING
Filed July 16, 1924

CLARENCE WINFRED SPICER
GURDON LUCIUS TARBOX
INVENTORS

BY
(THEIR) ATTORNEY

Patented Nov. 10, 1925.

1,561,192

UNITED STATES PATENT OFFICE.

CLARENCE WINFRED SPICER AND GURDON LUCIUS TARBOX, OF PLAINFIELD, NEW JERSEY, ASSIGNORS TO SPICER MANUFACTURING CORPORATION, A CORPORATION OF VIRGINIA.

FLEXIBLE COUPLING.

Application filed July 16, 1924. Serial No. 726,359.

*To all whom it may concern:*

Be it known that we, CLARENCE WINFRED SPICER and GURDON LUCIUS TARBOX, both citizens of the United States, residing in Plainfield, in the county of Union, State of New Jersey, have invented certain new and useful Improvements in Flexible Couplings, of which the following is a disclosure.

Our invention relates to flexible couplings such as are employed to connect rotatable power shafts of all kinds, and particularly to couplings for connecting the power shafts of automobiles, and is an improvement on flexible couplings described in United States Patents #1,425,616 and 1,443,440 granted to us.

The object of this invention is to produce a joint that is simple and compact in construction and one that can be easily assembled.

A further object of our invention is to provide a joint with simple means of compressing the resilient members.

The foregoing and other features of our invention will now be described in connection with the accompanying drawings forming part of this disclosure in which we have represented our flexible coupling in its preferred form, after which we shall point out more particularly in the claims those features which we believe to be new and of our own invention.

In the drawings accompanying and forming part of this specification:—

Figure 1:
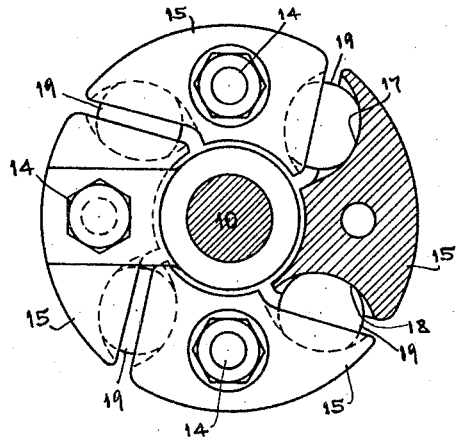
Figure 1 illustrates an embodiment of our invention partly broken away, at right angles to the shafts to be connected.
Figure 2:
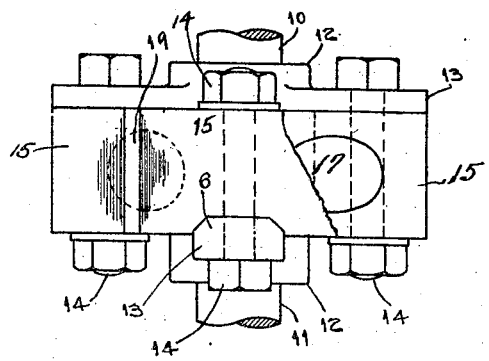
Figure 2 is a side view of the device at right angles to that shown on Figure 1 in part section.

In carrying out our invention we provide a flexible connection for shafts 10 and 11. On the end of each shaft are oppositely disposed hub members 12 provided with a plurality of radial arms 13. In the drawings two of these arms are shown but any number may be employed so long as the same number are used on both hubs. These arms extend out from the hub radially and are provided with a polygonal face and a stud or bolt 14 at right angles to the polygonal face. This stud serves as a pivot for the member 15 which is provided with a recess 16 that matches the polygonal face of the radial arms 13. The member 15 is also provided with two bowl shaped cavities 17 and 18 so placed and positioned that the cavity 18 extends part way under, and the cavity 17 extends part way over, the ball 19. These balls are made of rubber, rubber compounds or other resilient material and when disposed between the members 15 will function to flexibly connect the two parts of the coupling and will, owing to their flexibility and to their rolling action in the bowl shape cavities, permit the joint to operate at considerable angles.

Figure 3:
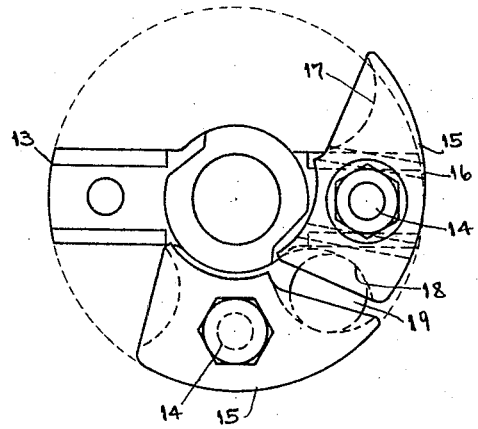
Figure 3 is a view similar to that shown in Figure 1 illustrating the convenient method of assembly.

As these rubber balls are inserted and maintained under substantial compression, we have provided the following means for easy assembly. Referring to Figure 3 it will be clearly seen after the first member 15 is securely fastened to its stud 14 so that the polygonal recess is straddling the polygonal face of the radial arm 13, the ball 19 is placed in the bowl shaped cavity 17 and the end of the second member 13 projecting out beyond the cavity 18 is tucked in under the ball and the bolt 14 inserted in its hole in the member 13. The polygonal faces of the radial arm 13 and the member 15 guide the member 13 into position with a turning motion which compresses the ball the desired amount. This operation is completed around the circle until all of the bowl shape cavities have been adjusted with proper compression on the balls.

It is perfectly obvious that any shape of face of the radial arms may be employed that will guide the member containing the bowl shaped cavities with a turning movement around the studs to bring compression upon the balls.

It is also apparent that two bolts may be employed, the member having bowl shaped cavities to pivot around one bolt, the second bolt being inserted to securely hold the members in position in the radial arms.

The hub members are secured to the shafts in any suitable manner known in the art.

Having thus fully described our invention what we claim as new and desire to secure by Letters Patent is:—

1. A flexible shaft coupling comprising two hub members carrying a plurality of radial projections with polygonal faces carrying studs or bolts at right angles thereto, members having recesses adapted to fit the polygonal faces of the projections adapted to be carried by the studs, said members also provided with bowl shaped cavities, balls of rubber or similar material disposed in said cavities and operating to flexibly connect the two parts of the coupling.

2. A flexible shaft coupling comprising two hub members carrying a plurality of radial projections, members pivotally mounted on said projections provided with bowl shaped cavities, balls of rubber or similar material disposed in said cavities operating under compression, means to turn the bowl shaped members to retain the balls under compression.

3. A flexible shaft coupling comprising two oppositely disposed hub members carrying a plurality of projections, members provided with bowl shaped cavities pivotally mounted on said projections, means to regulate the space between the oppositely disposed cavities by pivoting the members containing the cavities, balls of resilient material disposed in said cavities to flexibly connect the two parts of the coupling.

4. A flexible shaft coupling comprising driving and driven members carrying a plurality of radial arms each provided with a stud at right angles thereto, members provided with bowl shaped cavities mounted on the studs and provided with a recess or channel of similar cross section to that of the radial arms, balls of resilient material disposed in said cavities to flexibly connect the driving and driven members, said balls being seated in said cavities the curvature of each cavity being less than the curvature of the balls.

5. The device of claim 4 with means for bringing the ball under compression.

In testimony whereof we affix our signatures.

CLARENCE WINFRED SPICER.
GURDON LUCIUS TARBOX.